United States Patent [19]

Kiga et al.

[11] 3,989,615

[45] Nov. 2, 1976

[54] DIAPHRAGM PROCESS ELECTROLYTIC CELL

[75] Inventors: Shotaro Kiga; Shozo Chiba; Kenichi Edahiro; Naoshi Yoshida, all of Nakago; Masuo Nagasawa, Myokokogen, all of Japan

[73] Assignee: Nippon Soda Company Limited, Tokyo, Japan

[22] Filed: Aug. 20, 1973

[21] Appl. No.: 390,098

Related U.S. Application Data

[63] Continuation-in-part of Ser. No. 159,821, July 6, 1971, abandoned.

[52] U.S. Cl. .............................. 204/252; 204/282; 204/283; 204/295; 204/296
[51] Int. Cl.[2] ...................... C25B 1/20; C25B 1/26; C25B 13/04; C25B 11/03
[58] Field of Search .......... 204/295, 296, 282, 283, 204/252

[56] References Cited

UNITED STATES PATENTS

| | | | |
|---|---|---|---|
| 1,052,256 | 2/1913 | Hybinette | 204/295 |
| 1,742,411 | 1/1930 | Muller | 204/295 |
| 3,057,794 | 10/1962 | Carlin | 204/252 |
| 3,344,053 | 9/1967 | Neipert et al. | 204/283 X |
| 3,356,607 | 12/1967 | Eisenmann et al. | 204/301 |
| 3,413,239 | 11/1968 | Olstowski et al. | 252/506 |
| 3,583,891 | 6/1971 | Hacker et al. | 204/296 X |

FOREIGN PATENTS OR APPLICATIONS

| | | | |
|---|---|---|---|
| 375,085 | 5/1923 | Germany | 204/295 |
| 442,965 | 4/1927 | Germany | 204/295 |

*Primary Examiner*—F.C. Edmundson
*Attorney, Agent, or Firm*—George B. Oujevolk

[57] ABSTRACT

A high electrodensity chloro-alkali electrolytic diaphragm cell, wherein the diaphragm comprises a layer mixture of asbestos fibers and from 1 to 30 percent by weight of carbon fibers.

3 Claims, 12 Drawing Figures

DIAPHRAGM PROCESS ELECTROLYTIC CELL

This application is a continuation-in-part of Ser. No. 159,821 filed July 6, 1971, now abandoned.

This invention relates to an improvement of the diaphragm process chloro-alkali electrolytic cell, and more particularly, the object of the invention is to provide an electrolytic cell which can operate at an extremely high electric current density and produce a minimum of chlorate by-product.

Heretofore, the electric current density in the operation of the diaphragm process electrolytic cell is 10 A/dm$^2$ or the like degrees and its value is very little compared with the mercury process.

The principal reason is due to the fact that it is hard to get a diaphragm to endure the operation of high electric current density. Heretofore, a diaphragms in general use, for example, there were diaphragms made by directly adsorbing asbestos fibers on a wire net cathode and made by adsorbing asbestos fibers or other adsorbents on an asbestos paper put on the wire net cathode, however, these are not adequate for use in the operation of high electric current density for the following reasons. In the case of the former, hydrogen gas generated on the active surface of the cathode (wire net) has great power thrusting aside the diaphragm which is tightly fixed by intertwining asbestos fibers on the surface of cathode, and when an electrolytic cell is operated at a high electric current density, this power of thrusting aside is gradually strengthened to ultimately break down the diaphragm by the increased generation of the hydrogen gas.

For example, in the case of the operation of a high electric current density, it is necessary to use a thin diaphragm in order to increase the volume of passing brine, however, in such case, the hydrogen gas generation easily casues partial breaks of the diaphragm and the gas escapes into anode compartment, and consequently, chlorine gas and hydrogen gas are intermixed to create a very dangerous condition. On the other hand, if the diaphragm is prepared so firmly as not to be able to break it, the hydrogen acts so as to escape into the cathode compartment with pushing up the diaphragm, consequently, the asbestos fibers intertwined on the surface of the cathode are torn off from the cathode face, and the whole diaphragm floats to the surface of brine. In the case of the latter diaphragm, the diaphragm is mainly made of asbestos paper and does not intertwine tightly like the former diaphragm on the active surface of the cathode, so that the generated hydrogen can escape into the cathode compartment easily. Generally, the brine volume passing through the asbestos paper is, however, not so large, for example, an asbestos paper with 0.4mm thickness has a passing linear speed corresponding to only about 10 A/dm$^2$ electric current density, therefore, it can not be used for an electrolytic cell operating at a high electric current density.

In addition, occasionally an asbestos cloth is used as a diaphragm, but the asbestos cloth diaphragm usually has the non-uniformity in permeability to readily cause diffusion of chlorine and alkali and produce chlorate. The same defect is found in the case when a thin asbestos paper or an asbestos paper with rough density is used as a diaphragm.

After many years of research, the inventors have found a diaphragm structure having good properties such as good permeability for brine, high durable strength to high pressure of generated hydrogen and an excellent chloro-alkali electrolytic cell able to operate at a high electric current density of about 40 – 60 A/dm$^2$ and producing little chlorate by co-operation with metal electrodes.

The present invention contemplates a chloro-alkali electrolytic cell which enable the operation at an extremely high electric current density, such as 40 – 60 A/dm$^2$. A diaphragm comprising one or two nets made of a corrosion resistant filament or thread of thynethetic resin or metal and a layer of asbestos fibers, corrosion resistant and electro-insulating fibers other than asbestos fiber, such as glass fiber, polyvinylidene chloride fiber, polypropylene fiber, polyfluoroethylene fiber, and mixture fibers thereof; or mixed fibers, asbestos fibers and carbon fibers, or corrosion resistant and electro-insulating fibers hereinbefore mentioned; and electrodes are employed. The diaphragm may be prepared by having the fibers adsorbed or coated on the net, and then a second net is placed on the layer in the case of using two nets.

The preparation of the diaphragm may be carried out in the cell on or near the face of the cathode or out of the cell.

Figure 3:
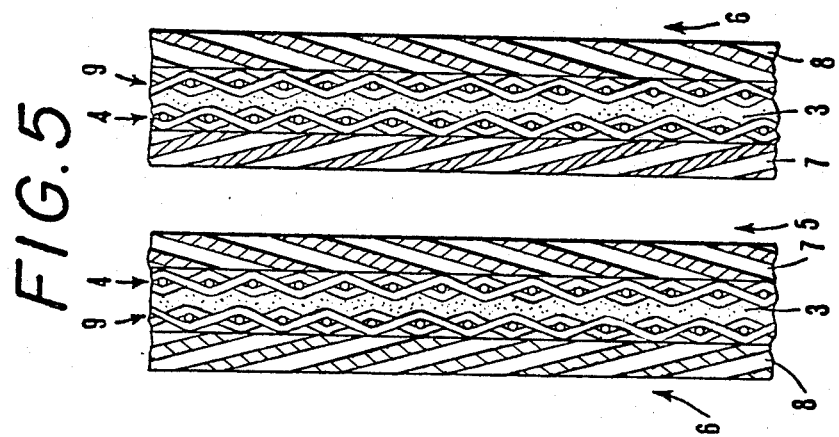
Figure 6:
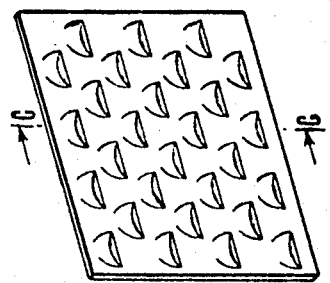
FIGS. 6, 7 and 8 are sketch-views of metal electrodes being used in said electrolytic cell.
Figure 7:
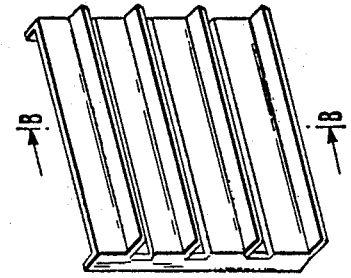
Figure 8:
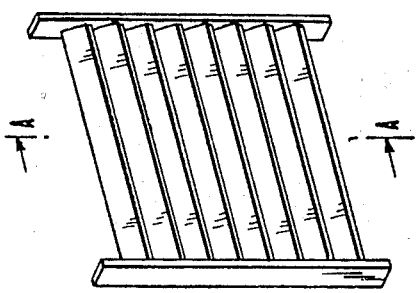
Figure 12:
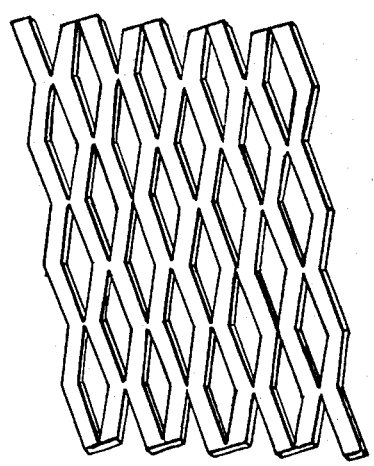
FIG. 12 is a sketch-view of an expanded type metal electrode.
Figures 10, 11:
FIGS. 9, 10 and 11 are side vertical sectional views showing a form of slits or holes corresponding to the electrodes of FIGS. 6, 7 and 8, respectively.
Figure 9:

In FIG. 3, 1 is a cathode (wire net), 5 is a cathode compartment, 4 is a net, 3 is a diaphragm layer, 2 is an anode (metal plate) and 6 is an anode compartment.

Figure 5:
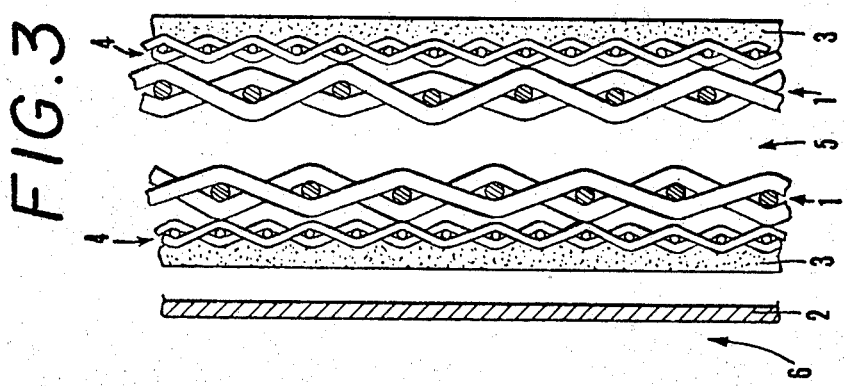
FIGS. 3, 4 and 5 are partial vertical sectional view showing a structure of one set of electrodes and diaphragms being used in said electrolytic cell.
Figure 4:
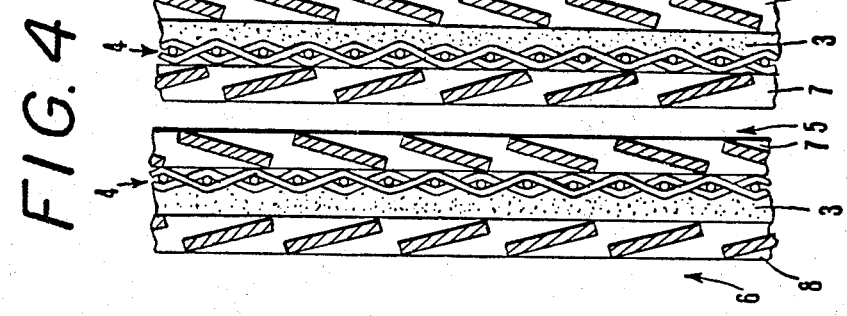

In the present invention, the cathode is of course allowed to use a wire net or the like hitherto widely used, but a cathode shown in FIGS. 4 and 5, such as a plate having many little holes, can also be used. A net 4 is placed so as to stand face to face to the cathode 7 with or without a slight gap, and the most preferable range of mesh of the net is about 10 – 32 mesh. In case the mesh of the net is too fine, it is difficult to entwine the fibers on the net when the diaphragm is prepared by adsorbing fibers. On the other hand, in case the net is too rough, the fibers cannot be entwined sufficiently, and so form an incomplete layer on the net.

Preferred material for the net is either synthetic resin or metal having corrosion resistant properties to catholyte, and especially a net made of iron or stainless steel is advantageous from the viewpoint of cost, solidity, workability and prevention of chlorate formation.

In the case of using a net of synthetic resin, polyvinylidene chloride, polypropylene, poylfluoroethylene and the like are employed as proper materials, and further the net of thread made of short fiber is preferable to the net of filament or thread made of long fiber because the fibers can be easily entwined when preparing a diaphragm, so as to produce a uniform and firmly fixed diaphragm.

In the case of a metal net, if the net is correctly connected electrically with the cathode, the net actually works as a cathode, and hydrogen generates on the surface of the net unfavourably if the net is not made of material having high hydrogen over voltage.

It is not necessary however that a spacer or the like be used for insulation between the cathode and the net, and it is most preferable that the net be placed so as to roughly connect with the cathode at only a few points by simply putting the net on the cathode.

In a connection as described, hydrogen generates slightly on the net, therefore, the net acts as an electrical screen by the negative charge thereof and prevents diffusion of OH⁻ to the anode compartment side, and has the effect of reducing the formation of chlorate without tearing off the layer.

Also in the case of synthetic resin nets (without metal nets), if it is possible to charge a negative electrical potential of $\zeta$ (zeta) on the net the like effect can be expected.

The diaphragm layer 3 is prepared on the net 4 by means of a process similar to the prior art of adsorption or coating process in which fibers are adsorbed or coated directly on the wire net (cathode). It is preferable that the adsorption or the coating of the fibers are performed so as to adsorb or coat uniformly over the whole face of the net 4, and further the thickness of the adsorbed or coated layer (hereinafter referred to as diaphragm thickness) is regulated to fit the electric current density to be employed.

For example, if it is desired to operate at an electric current density of 40 A/dm$^2$ using asbestos fiber as the fiber, it is favourable that the diaphragm thickness is about 2mm, and further if more high electric current density is desired, the net should be thinner. However, if the diaphragm thickness is too thin, it becomes difficult to keep a neutral point in the diaphragm layer, consequently the formation of chlorate is remarkably increased.

In order to avoid this defect, the following methods can be employed:

1. regulating a mixing ratio of the fibers which differ in diameters from each other (generally, when the diaphragm is prepared by mixed fibers containing a large amount of thick and long fibers, the solution permeability becomes good); and,
2. regulating a mixing ratio and/or selecting kinds of fibers, such as a carbon fiber and corrosion resistant and electro-insulating fibers (other than asbestos fiber) like above-mentioned.

Methods 1 and 2 are effective for the purpose of maintaining the appropriate thickness of the layer and preventing the reduction of the permeability. For the above-mentioned purpose, it is most preferable to mix carbon fibers with asbestos fibers. In the case of using the diaphragm made of carbon fibers and asbestos fibers, the permeability is sufficient and other advantages are as follows:

1. The diameter of the carbon fibers is small (approximately 7 to 10$\mu$) and carbon fibers have uniformity, so that very uniform mixed fibers can be made.
2. Carbon fibers are so hydrophlic as to cause the resistance of the diaphragm and cell voltage to decrease.
3. $\zeta$ (Zeta) potential of carbon fibers becomes negative in the electrolyte, so that the diffusion of OH⁻ to the anode compartment is prevented and production of chlorate is diminished (and the content of oxygen in the anode gas is decreased). In order to strengthen this effect, it is preferable to use the carbon fibers having an ion exchange group such as sulfon group.
4. Carbon fibers are very stable to the chemicals and stable at a high temperature, so that the duration of the diaphragm becomes very long.
5. Only a small amount of carbon fibers takes effect to prevent the diffusion of OH⁻, because of the small diameter of carbon fibers, namely the large surface area of said fibers.

For example, the diaphragm layer is prepared by making a thick slurry of a mixed fibers of about 90% by weight of asbestos fibers and about 10% by weight of carbon fibers in a caustic solution adhere on a net put on the cathode by suction.

The diaphragm prepared in this way has a better brine permeability than a diaphragm prepared by using only asbestos fibers, and of course, it has the above-mentioned advantages. If the fibers in the layer come to have a tendency to loosely fasten to each other or swell in the brine, such a tendency can be prevented by putting another net made of corrosion resistant material to anolyte on the anode side of the layer.

If the amount of mixed carbon fibers are increased more than 10% by weight, the layers become so swollen as to require the use of another net to hold the layers so they will keep a certain shape and thickness (as shown in FIG. 5). In this case the operation of the electrolytic cell can be more effectively carried out and further the diaphragm thus prepared has excellent durability.

Although carbon fiber has electric conductivity, a layer made of a mixed fibers consisting of about 30 percent by weight of carbon fibers and 70 percent by weight of asbestos fibers can be used as the main part of the diaphragm without any electrical difficulty as to the operation even when the diaphragm attaches to electrodes.

The inventors have further discovered that, in employing a diaphragm having two nets and a layer, the layer of mixed or unmixed fibers (except asbestos fibers) having corrosion resistant and electro-insulating properties, such as glass fibers, polyvinylidene chloride fibers, polypropylene fibers, polyfluroethylene fibers, or mixtures thereof, could also be used without difficulty.

The thickness of the diaphragm usable in this invention is in a range of 1mm to 10mm and more preferably 2mm to 6mm.

With respect to the kinds of material used for the anode 2 in the present invention, it is not limited especially, but for use in a high electric current density a metal anode is better than a carbon anode.

FIG. 4 shows an example of a set of electrodes and diaphragm hereinbefore mentioned and FIG. 5 also shows another example of a set of this invention.

In FIGS. 4 and 5, Nos. 3, 4, 5 and 6 have the same meaning as indicated in the explanation of FIG. 3 above. 7 shows cathodes, 8 shows anodes and 9 shows a net facing the anode.

In FIGS. 4 and 5 all of the electrodes 7 and 8 have many holes or slits, and further the holes and the slits are formed so as to open upward. In this way, generated gases can be discharged easily behind the electrodes, so that the surface of the electrodes is allowed to be maintained in an active state, consequently the wire net of cathode used in the prior art is not necessary. It is possible to place a part or parts of the anode 8 so as to contact with the face of the diaphragm (FIG. 4) or the face of the net 9 (FIG. 5), and thereby the diaphragm is safely kept and can be prevented from falling off and further it becomes possible to charge with a large volume of electric current and to easily operate a cell at a high electric current density by employing plate cathodes.

The structure of the electrode shown in FIGS. 4 and 5 are merely examples, and in addition, it is possible to use several electrodes of different structure, such as an electrode having eaves which may be made by (partially) cutting and bending the electrode plate and an electrode merely having many little holes.

Examples of electrodes to be used for the electrolytic cell of the present invention are shown in FIGS. 6, 7, 8 and 12.

The diaphragm of this invention may be used together with the cathode or anode of the usual type in cooperation with the electrodes mentioned.

According to the present invention, even if hydrogen is generated very vigorously by operation at a high electric current density, it can smoothly pass through the slits or holes to the cathode compartment without any rupture or breakdown of the diaphragm because of the net 4 and the diaphragm layers of this invention. There is considerable flexibility and a narrow space exists between the active surface of the cathode and net 4 to act as a buffer to the impact of expanding pressure produced by vigorously generated hydrogen gas.

As mentioned above, according to the present invention, electrolysis can be carried out at a high electric current density which heretofore could not be imagined, for example, such as 40 – 60 $A/dm^2$, and further, the invention may serve for reducing the floor space and the costs for construction, maintenance and repairing of electrolytic cell equipment.

For the purpose of giving those skilled in the art a better understanding of the invention, the following examples are given:

EXAMPLE 1

Figure 1:
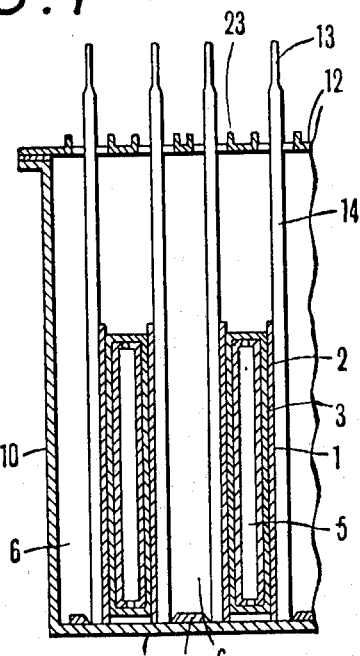
FIG. 1 is a partial sectional view showing an electrolytic cell with respect of the present invention.
Figure 2:
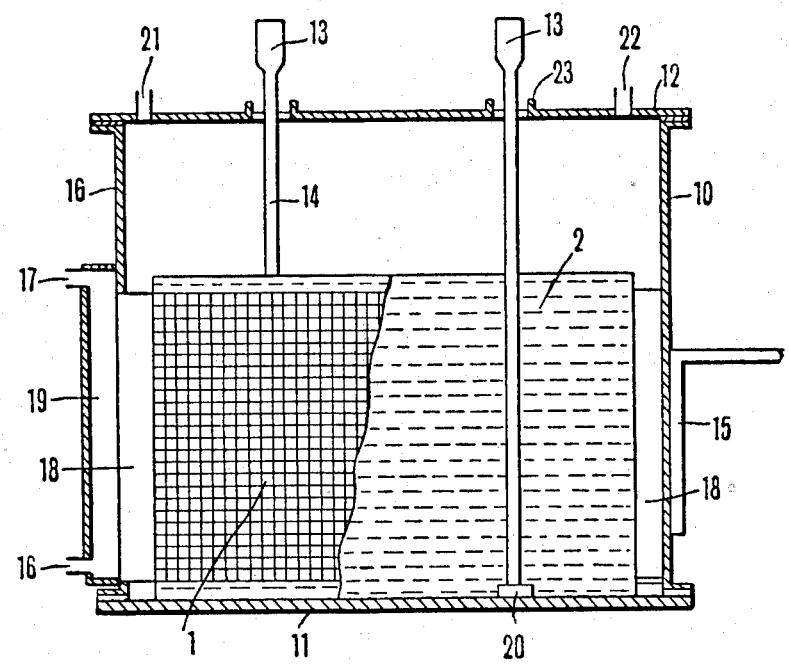
FIG. 2 is a side elevational view of said electrolytic cell with a side wall removed and in partial section.

A vertical chloro-alkali electrolytic cell shown in FIGS. 1 and 2 was used, the metal anode is as shown in FIG. 3 having a width of 500mm and height of 600 mm, and as the cathode, a wire net made of iron as shown in FIG. 3 having the same size as the anode, was used. A diaphragm was prepared by adsorbing asbestos fiber on an iron net of 14 mesh being put on the cathode. The diaphragm thickness was 2mm and the anode and the cathode were set up so as to keep the electrodes gap (a distance between an anode and a cathode) of 12mm. In FIGS. 1 and 2 the names of the parts with respect of the electrolytic cell are as follows: 1 is a cathode, 2 is an anode, 3 is the diaphragm layer, 10 is a side wall, 11 is a bottom plate, 12 is a cell cover, 13 is an anode terminal, 14 is an anode lead post, 15 is a cathode terminal, 16 is a catholyte outlet, 17 is a hydrogen outlet, 18 is a cathode support, 19 is a catholyte compartment, 20 is an anode fixing rib, 21 is a brine feed, 22 is a chlorine outlet and 23 is an anode lead post nozzle. (In FIGS. 1 and 2, net 4 and net 9 shown in the FIGS. 4 and 5 are omitted.)

The cell was operated at an electric current density of 40 $A/dm^2$, and data of electrolytic cell voltage, electrolytic temperature, concentration of caustic soda and chlorate in withdrawal catholyte and hydrogen content in the chlorine gas (anode gas) were measured. The results are shown in Table 1. In spite of long-time operation, tearing and other difficulties of the diaphragm were not found to exist and the chlorate content in the catholyte was extremely low.

EXAMPLE 2

The same diaphragm vertical electrolytic cell as shown in Example 1 was used. Instead of the anode in Example 1, a metal anode having a structrue of the expanding type and having a width of 500 mm and a height of 800mm was used. The electrodes gap and a diaphragm thickness were 6mm and 2mm, respectively, and other conditions were all the same as in Example 1, and the electrolysis was carried out at an electric current density of 40 $A/dm^2$, and the same items as in Example 1 were measured. In the case of this Example, in spite of a long-time operation, tearing off and other difficulties of the diaphragm was not found and the chlorate content in the catholyte was extremely low.

EXAMPLE 3

Instead of an iron net of 14 mesh in the Example 2, a Saran net of 14 mesh was used, and the other conditions were all the same as in Example 2, and the electrolysis was carried out at an electric current density 40 $A/dm^2$ and the same items were measured. As a result, in spite of a long-time operation, tearing off and other difficulties of the diaphragm was not found and the chlorate content in the catholyte was extremely low.

EXAMPLE 4

Instead of the diaphragm of Example 2 which caused asbestos fiber to adsorb, a diaphragm prepared as follows was used: asbestos fibers containing about 10% (by weight) carbon fibers were caused to be adsorbed on the same iron net as in Example 2 in a diaphragm thickness of 3mm and then 14 mesh titanium net was put on the asbestos layer to hold the layer. The electrolysis was carried out at an electric current density of 60 $A/dm^2$. Other conditions were carried out as well as the Example 2 conditions and the measuring results of the items are as shown in Table 1. In spite of long-time operation, tearing off and other difficulties of the diaphragm was not found and the chlorate content in the catholyte was extremely low.

EXAMPLE 5

Instead of the diaphragm of Example 2, a diaphragm prepared as follows was used: asbestos fibers containing about 5% (by weight) carbon fibers were adsorbed on the same iron net as in Example 2. A diaphragm thickness was 3mm. The electrolysis was carried out at an electric current density of 40 $A/dm^2$. Other conditions were carried out as well as the Example 2.

In spite of long-time operation, tearing off and other difficulties of the diaphragm was not found and the chlorate content in the catholyte was extremely low.

COMPARATIVE EXAMPLE 1

In the same diaphragm process vertical chloro-alkali electrolytic cell as Example 1, the diaphragm layer was prepared by adsorption of asbestos fiber on the wire net cathode directly in accordance with prior art process. The diaphragm thickness was made 4mm. Other conditions are all the same as in Example 1 and the electrolysis was carried out at an electric current density 20 $A/dm^2$. The same items were measured. The results were that the caustic soda concentration in the catholyte rose by reason that membrane resistance was large, and the chlorate content in catholyte increased considerably.

COMPARATIVE EXAMPLE 2

In the same diaphragm vertical electrolytic cell as Comparative Example 1, the diaphragm thickness was made 2mm, and the electrolysis was carried out at an electric current density of 40 A/dm$^2$. Other conditions were all the same as in Comparative Example 1. In a like manner, the same items were measured. The results were that a part of the diaphragm broke down and consequently the generated hydrogen intermixed into the chlorine gas generated at the anode and a dangerous condition arose, and also the chlorate content in the catholyte increased considerably.

|  |  | electric current density | electrolyte temperature | diaphragm thickness | Anode gas composition | | catholyte composition | | cell voltage | electrodes cap |
| --- | --- | --- | --- | --- | --- | --- | --- | --- | --- | --- |
|  |  | A/dm$^2$ | °C | mm | Cl$_2$ (%) | H$_2$ (%) | NaOH (g/liter) | NaClO$_3$ (g/liter) | v | mm |
| Present Invention | Example 1 | 40 | 80 | 2 | 98.5 | 0 | 140 | 0.1 | 4.8 | 12 |
|  | " 2 | 40 | 80 | 2 | 98.5 | 0 | 140 | 0.1 | 3.71 | 6 |
|  | " 3 | 40 | 80 | 2 | 98.5 | 0 | 140 | 0.1–0.2 | 3.79 | 6 |
|  | " 4 | 60 | 80 | 3 | 98.5 | 0 | 140 | 0.1–0.2 | 4.2 | 6 |
| Comparative Example | 1 | 20 | 80 | 4 | 98.5 | 0 | 250 | 4 | 3.75 | 12 |
|  | 2 | 40 | 80 | 2 | 80 | 16 | 140 | 3 | 4.8 | 12 |

We claim:

1. A chloro-alkali electrolytic cell which operates at a current density of 40 to 60 amperes per square decimeter, comprising anode and cathode compartments with a metal anode and a metal cathode opposing each other and a diaphragm therebetween, the distance between said anode and said cathode being at most 12 mm, said anode being a metal plate having holes or slots, said cathode being a rough metal wire net or plate having holes or slots, said diaphragm having a thickness of 1 mm to 10 mm, being permeable to brine and being made of a non-conductive adsorbing layer, said adsorbing layer being made of a mixture of asbestos fibers and from 1 to 30 percent by weight of carbon fibers, said carbon fibers having a diameter of approximately 7 to 10$\mu$, and a net having a mesh size of 10 to 32 Tyler, said adsorbing layer being formed by adhering said mixture on said net by suction, said diaphragm being disposed between said cathode and said anode so that said net contacts the active face of said cathode at discrete points and said adsorbing layer faces or contacts the active face of said anode.

2. A chloro-alkali electrolytic cell which operates at a current density of 40 to 60 amperes per square decimeter, comprising anode and cathode compartments with a metal anode and a metal cathode opposing each other and a diaphragm therebetween, the distance between said anode and said cathode being at most 12 mm, said anode being a metal plate having holes or slots, said cathode being a rough metal wire net or plate having holes or slots, said diaphragm having a thickness of 1 mm to 10 mm, being permeable to brine and being made of a non-conductive adsorbing layer, said adsorbing layer being made of a mixture of asbestos fibers and from 10 to 30 percent by weight of carbon fibers, said carbon fibers having a diameter of approximately 7 to 10$\mu$, a first net having a mesh size of 10 to 32 Tyler, said adsorbing layer being formed by adhering said mixture on said first net by suction, and a second net pressed against said diaphragm, said diaphragm being disposed between said cathode and said anode so that said first net contacts the active face of said cathode at discrete points and said second net faces or contacts the active face of said anode.

3. A high electrodensity chloro-alkali electrolytic diaphragm cell as claimed in claim 2, wherein the diaphragm has a thickness of 2 mm to 6 mm.

* * * * *